US009111457B2

(12) United States Patent
Beckley et al.

(10) Patent No.: US 9,111,457 B2
(45) Date of Patent: Aug. 18, 2015

(54) VOICE PRONUNCIATION FOR TEXT COMMUNICATION

(75) Inventors: Kristina Beckley, Carlisle, MA (US);
Vincent Burckhardt, Clonee (IE);
Alexis Yao Pang Song, Cary, NC (US);
Smriti Talwar, Clonsilla (IE)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 13/237,058

(22) Filed: Sep. 20, 2011

(65) Prior Publication Data

US 2013/0073287 A1 Mar. 21, 2013

(51) Int. Cl.
| | | |
|---|---|---|
| *G10L 13/08* | (2013.01) | |
| *G09B 5/04* | (2006.01) | |
| *G09B 19/04* | (2006.01) | |
| *H04M 3/42* | (2006.01) | |
| *H04L 12/58* | (2006.01) | |
| *H04W 4/12* | (2009.01) | |
| *H04W 4/16* | (2009.01) | |

(52) U.S. Cl.
CPC *G09B 5/04* (2013.01); *G09B 19/04* (2013.01); *H04L 12/5835* (2013.01); *H04M 3/42382* (2013.01); *H04M 2203/252* (2013.01); *H04W 4/12* (2013.01); *H04W 4/16* (2013.01)

(58) Field of Classification Search
CPC ..... G10L 13/08; G10L 19/0018; G10L 15/02; G06F 17/28
USPC ........... 704/3, 231, 260, 270, 275; 379/88.16; 434/167, 185, 319; 715/751
See application file for complete search history.

(56) References Cited

U.S. PATENT DOCUMENTS

| | | | | |
|---|---|---|---|---|
| 5,787,231 | A * | 7/1998 | Johnson et al. | 704/260 |
| 6,302,695 | B1 * | 10/2001 | Rtischev et al. | 434/157 |
| 6,453,290 | B1 * | 9/2002 | Jochumson | 704/231 |
| 6,775,357 | B2 * | 8/2004 | Crockett et al. | 379/88.02 |
| 6,865,533 | B2 * | 3/2005 | Addison et al. | 704/260 |
| 7,149,690 | B2 * | 12/2006 | August et al. | 704/270 |
| 7,519,667 | B1 | 4/2009 | Capps | |
| 7,624,149 | B2 | 11/2009 | Sheppard et al. | |
| 7,698,140 | B2 * | 4/2010 | Bhardwaj et al. | 704/260 |
| 7,831,422 | B1 * | 11/2010 | Jochumson | 704/231 |
| 8,126,719 | B1 * | 2/2012 | Jochumson | 704/270.1 |
| 8,160,881 | B2 * | 4/2012 | Klee et al. | 704/260 |
| 8,694,031 | B2 * | 4/2014 | Lew et al. | 455/466 |
| 2005/0266831 | A1 * | 12/2005 | Roth | 455/412.1 |

(Continued)

OTHER PUBLICATIONS

IBM, "IM User name Speaker," IPCOM000173839D, Aug. 25, 2008, pp. 1-2.

(Continued)

*Primary Examiner* — Vijay B Chawan
*Assistant Examiner* — Seong-Ah A. Shin
(74) *Attorney, Agent, or Firm* — Holland & Knight LLP; Brian J. Colandreo, Esq.; Jeffrey T. Placker, Esq.

(57) ABSTRACT

A method, computer program product, and system for voice pronunciation for text communication is described. A selected portion of a text communication is determined. A prompt to record a pronunciation relating to the selected portion of the text communication is provided at a first computing device. The recorded pronunciation is associated with the selected portion of the text communication. A visual indicator, relating to the selected portion of the text communication and the recorded pronunciation, is displayed.

18 Claims, 5 Drawing Sheets

(56) References Cited

U.S. PATENT DOCUMENTS

| | | |
|---|---|---|
| 2006/0031361 A1 | 2/2006 | Bailey et al. |
| 2007/0088547 A1* | 4/2007 | Freedman .................... 704/235 |
| 2007/0143414 A1 | 6/2007 | Daigle |
| 2007/0219799 A1* | 9/2007 | Ozkaragoz et al. ........... 704/260 |
| 2008/0082316 A1* | 4/2008 | Tsui et al. ......................... 704/4 |
| 2008/0086565 A1 | 4/2008 | Murphy et al. |
| 2008/0147794 A1 | 6/2008 | Limberg |
| 2008/0240382 A1 | 10/2008 | Fujita-Yuhas |
| 2009/0048821 A1 | 2/2009 | Yam et al. |
| 2009/0083637 A1* | 3/2009 | Skakkebaek et al. ......... 715/751 |
| 2009/0147931 A1 | 6/2009 | Gartner |
| 2009/0248392 A1* | 10/2009 | Talwar et al. ..................... 704/3 |
| 2009/0327433 A1 | 12/2009 | Comertoglu et al. |
| 2011/0067024 A1 | 3/2011 | Chiu et al. |
| 2013/0310089 A1* | 11/2013 | Gianoukos et al. ........... 455/466 |

OTHER PUBLICATIONS

IBM, "Enterprise IM User Name Speaker Based on Employee Management System," IP COM000174088D, Aug. 26, 2008, pp. 1-2.

\* cited by examiner

VOICE PRONUNCIATION FOR TEXT COMMUNICATION

TECHNICAL FIELD

This disclosure relates to text communication.

BACKGROUND

Text communication can be an efficient way to exchange information, but may also exhibit various deficiencies. For example, workers may be able to efficiently communicate information by text—e.g., through instant messaging programs—despite being otherwise engaged in separate (but potentially related) voice calls. Additionally, text communication may be a useful mode for exchanging information among participants, presenters and moderators of eMeetings, without interrupting oral or other presentation materials. Further, text communication may result in a ready-made transcript of an interaction, which may be referenced in order to recall or review the content of the interaction. One deficiency of text communication, however, is the potential lack of guidance for the pronunciation of typed words. It may be difficult, for example, to convey the proper pronunciation of names, places, products or other words and phrases through text communication alone.

BRIEF SUMMARY OF THE DISCLOSURE

According to a first aspect of the disclosure, a method includes determining a selected portion of a text communication. The method further includes, providing, at a first computing device, a prompt to record a pronunciation relating to the selected portion of the text communication. The method further includes associating the recorded pronunciation with the selected portion of the text communication, and displaying a visual indicator relating to the selected portion of the text communication and the recorded pronunciation.

One or more of the following features may be included. The method may include playing the recorded pronunciation based upon, at least in part, an input at at least one of the first computing device or a second computing device. The method may further include determining the selected portion of the text communication based upon, at least in part, an input at the first computing device. The method may further include determining the selected portion of the text communication based upon, at least in part, an input at a second computing device. The text communication may include an instant messaging communication. The text communication may also include a message from a chat-enabled eMeeting. The method may further include transmitting the recorded pronunciation to a second computing device.

According to another aspect of the disclosure, a computer program product resides on a computer readable storage medium and has a plurality of instructions stored on it. When executed by a processor, the instructions cause the processor to perform operations including determining a selected portion of a text communication. The operations also include providing, at a first computing device, a prompt to record a pronunciation relating to the selected portion of the text communication. The operations further include associating the recorded pronunciation with the selected portion of the text communication, and displaying a visual indicator relating to the selected portion of the text communication and the recorded pronunciation.

One or more of the following features may be included. The operations may include playing the recorded pronunciation based upon, at least in part, an input at at least one of the first computing device or a second computing device. The operations may include determining the selected portion of the text communication based upon, at least in part, an input at the first computing device. The operations may further include determining the selected portion of the text communication based upon, at least in part, an input at a second computing device. The text communication may include an instant messaging communication. The text communication may also include a message from a chat-enabled eMeeting. The operations may also include transmitting the recorded pronunciation to a second computing device.

According to another aspect of the disclosure, a computing system includes at least one processor and at least one memory architecture coupled with the at least one processor. The computing system also includes a first software module executable by the at least one processor and the at least one memory architecture, wherein the first software module is configured to determine a selected portion of a text communication. Further, the computing system includes a second software module which is configured to provide, at a first computing device, a prompt to record a pronunciation relating to the selected portion of the text communication. The computing system also includes a third software module which is configured to associate the recorded pronunciation with the selected portion of the text communication. The computing system further includes a fourth software module which is configured to display a visual indicator relating to the selected portion of the text communication and the recorded pronunciation.

One or more of the following features may be included. The computer system may include a fifth software module executable by the at least one processor and the at least one memory architecture, wherein the fifth software module may be configured to transmit the recorded pronunciation to a second computing device. A sixth software module may be configured to play the recorded pronunciation based upon, at least in part, an input at at least one of the first computing device or a second computing device A seventh software module may be configured to determine the selected portion of the text communication based upon, at least in part, an input at the first computing device. An eighth software module may be configured to determine the selected portion of the text communication based upon, at least in part, an input at a second computing device. The text communication may include an instant messaging communication. The text communication may also include a message from a chat-enabled eMeeting.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements

DETAILED DESCRIPTION OF THE PREFERRED EMBODIMENTS

Figure 1:
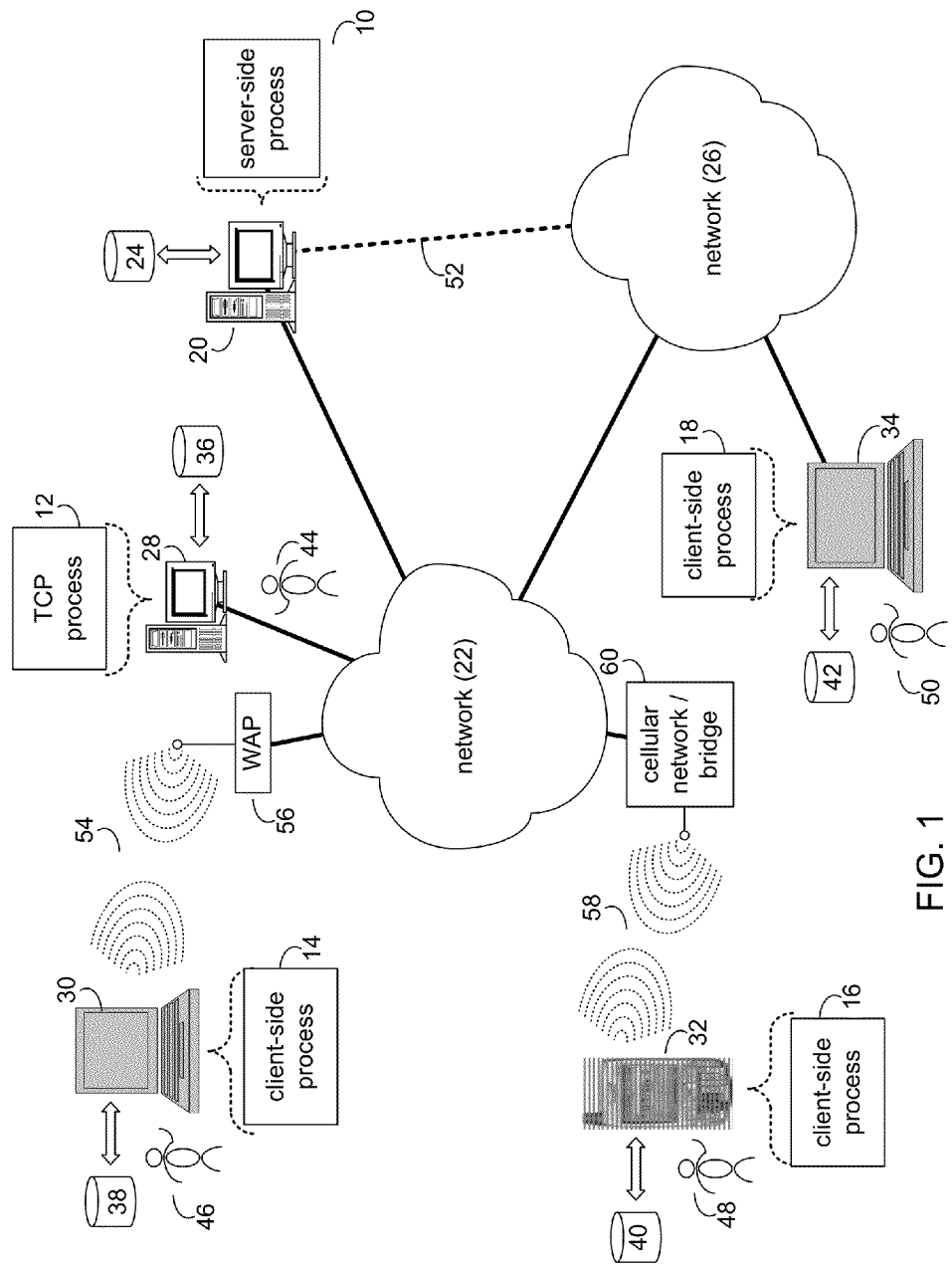
FIG. 1 is a diagrammatic view of a text communication pronunciation process coupled to a distributed computing network.
Figure 2:
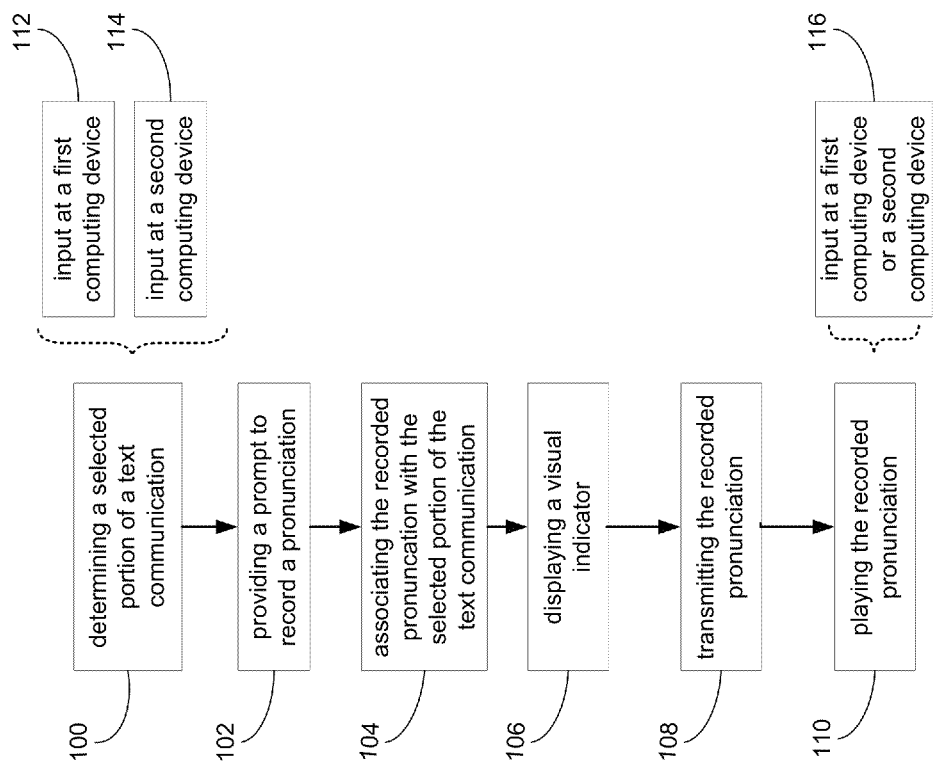
FIG. 2 is a flowchart view of a text communication pronunciation process.

Referring to FIGS. 1 & 2, there is shown a text communication pronunciation (TCP) process, for example process 12. As will be discussed further below, process 12 may include determining 100 a selected portion of a text communication. Determining 100 a selected portion of a text communication may be based upon, at least in part, input 112 at a first computing device or input 114 at a second computing device. Process 12 may also include providing a prompt 102 to record a pronunciation. Process 12 may also include associating 104 the recorded pronunciation with the selected portion of the text communication. Further, process 12 may include displaying 106 a visual indicator relating to the selected portion of the text communication and the recorded pronunciation. Additionally, process 12 may include transmitting 108 the recorded pronunciation to a second computing device. Process 12 may also include playing 110 the recorded pronunciation in response to an input 116 at a first computing device or a second computing device.

A TCP process may be a server-side process (e.g., server-side process 10), a client-side process (e.g., client-side process 12, client-side process 14, client-side process 16, or client-side process 18), or a hybrid server-side/client-side process (e.g., the combination of server-side process 10 and one or more of client-side processes 12, 14, 16, 18).

Server-side process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

One or more of client-side processes 12, 14, 16, 18 and server-side process 10 may interface with each other (via network 22 and/or network 26).

Users 44, 46, 48, 50 may access server-side process 10 directly through the device on which the client-side process (e.g., client-side processes 12, 14, 16, 18) is executed, namely client electronic devices 28, 30, 32, 34, for example. Users 44, 46, 48, 50 may access server-side process 10 directly through network 22 and/or through secondary network 26. Further, server computer 20 (i.e., the computer that executes server-side process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

A Text Communication Pronunciation (TCP) Process

For the following discussion, client-side TCP process 12 will be described for illustrative purposes. It should be noted that client-side process 12 may be incorporated into server-side process 10 and may be executed within one or more applications that allow for communication with client-side process 12. However, this is not intended to be a limitation of this disclosure, as other configurations are possible (e.g., stand-alone client-side processes and/or stand-alone server-side processes.) For example, some implementations may include one or more of client-side processes 14, 16, 18 in place of or in addition to client-side process 12.

Workers may exchange text communications in a variety of ways in addition to or in place of oral communication. For example friends or colleagues may employ instant messaging programs to exchange information by way of typed messages that are transmitted from the sender to the recipient on command. Such instant messaging programs allow direct text communication between conversation participants and may be integrated with other programs or may serve as stand-alone applications. For example, certain email programs such as Microsoft Outlook or online email clients such as Gmail may include the capability for one user to "chat" with other users who are logged on to the program. As another example, stand-alone programs such as ICQ or America Online Instant Messenger, may also allow users to chat with other individuals who are logged on to the particular service.

For a variety of reasons, text communication may sometimes be preferable and/or complementary to voice communication. In some circumstances, workers may find that they need to rapidly exchange information with colleagues but are unable to engage in a telephonic conversation. For example, a worker may be engaged in a telephonic conversation with one colleague, who has asked the worker for a reference, formula or other information that is in the possession of a colleague not participating in the telephonic call. The worker may find it expedient to send an instant message or other text communication to the second colleague in order to quickly retrieve the information, without interrupting the telephonic conversation. Similarly, many workers find the pace and/or protocol of a text communication to be less distracting than that of telephonic communication. This may allow workers to more efficiently multi-task, while maintaining one or more open lines of communication. For example, a worker may be composing an email or memorandum or engaging in a variety of other tasks while also maintaining one or more "open" text communication sessions. Further, whereas protocol of spoken communications generally requires prompt responses to questions or comments, protocol of text communication may permit long pauses in the "conversation," such as may allow a worker to concentrate on a more pressing task without losing the thread of the text interaction.

Alternatively, text communication may be useful for participation or collaboration in a chat-enabled eMeeting. An eMeeting as used herein may refer to a meeting, presentation, seminar or other interaction that takes place via electronic means, often via a centralized server. For example, an eMeeting may allow an individual to present slides or other material to a remote audience while simultaneously presenting related information orally, for example, using Voice-over-IP (VoIP) or standard fixed-line telephony. In another form, an eMeeting may also allow multiple participants located remotely from each other to collaborate on creating or editing a document, or work together in planning or executing a project. Certain types of eMeetings may permit participants to speak directly to each other using, for example, VoIP or other forms of telephony.

In a chat-enabled eMeeting, in addition (or as an alternative) to oral communication, participants may communicate with each other and/or the presenters via text communication. Such text communication may often be accomplished via a centralized text forum. In other words, instead of sending a text communication directly to another participant in an eMeeting (although this may be possible) participants may instead often submit a text communication directly to the eMeeting, causing the text communication to be posted in a conversation window that is viewable by many or all of the eMeeting participants.

Such chat-enabled eMeetings may be particularly useful if excessive spoken communication could interrupt an ongoing presentation or result in inefficient collaboration. For example, if participants in an eMeeting were able to offer spoken comments and feedback regarding presentation material, such comments and feedback, if delivered orally, might result in interruption of the presenter and degradation of the experience for non-commenting participants. However, if a participant is able to comment or otherwise offer feedback with text communication, others may view and consider the comments or feedback as desired without causing an interruption of the presenter. Similarly, in a collaborative eMeeting, if multiple individuals attempt to provide spoken comments simultaneously, it may be difficult to distinguish the ideas of the various speakers and valuable suggestions may be lost or ignored. But, if the participants instead provide comments through text communication, each comment may be considered in turn and the group may more efficiently focus on the most relevant or helpful comments.

In text communication, it may sometimes be necessary to specify the pronunciation of a word, name or other phrase that forms part of the communication. For example, a text communication may involve discussion of a new manager or client whose name is particularly difficult to pronounce. Often simply typing the name may not provide sufficient information to enable the recipient to determine the correct pronunciation. Programs that automatically convert text to speech, moreover, may often fail to correctly convert names, words or phrases with difficult, unusual or foreign spellings into the correct spoken pronunciation. Also, banks of previously-created pronunciations may be insufficient alone to accommodate the vast possible universe of necessary pronunciations—for example, names of newly introduced individuals or entities.

Process 12 may include determining 100 a selected portion of a text communication. As noted, a text communication may sometimes include a phrase, word or name that may be difficult for some individuals to pronounce correctly, based only on its spelling. Accordingly, process 12 may include selecting the phrase, word or name in order to associate a pronunciation with it. For example, referring to FIG. 3, text communication window 70 may include a text-entry window 76, into which User A may type the text communications she wishes next to transmit to User B. Text that has been transmitted from User A to User B, and vice versa, is displayed in conversation window 74.

Text communication window 70, as shown, represents a typical view of User A. User B may view a similar text communication window, with similar components, such as a text-entry window and a conversation window. Typically User B does not see text entered into User A's text-entry window 76 until User A has sent the text to User B. Once sent, however, the text may appear in User B's conversation window, often preceded or otherwise annotated with the identity of the sender (e.g., User A). Although a conversation between only two participants is depicted in window 70, text communications may include multiple participants as indicated, for example, by user list 72.

Figure 3:
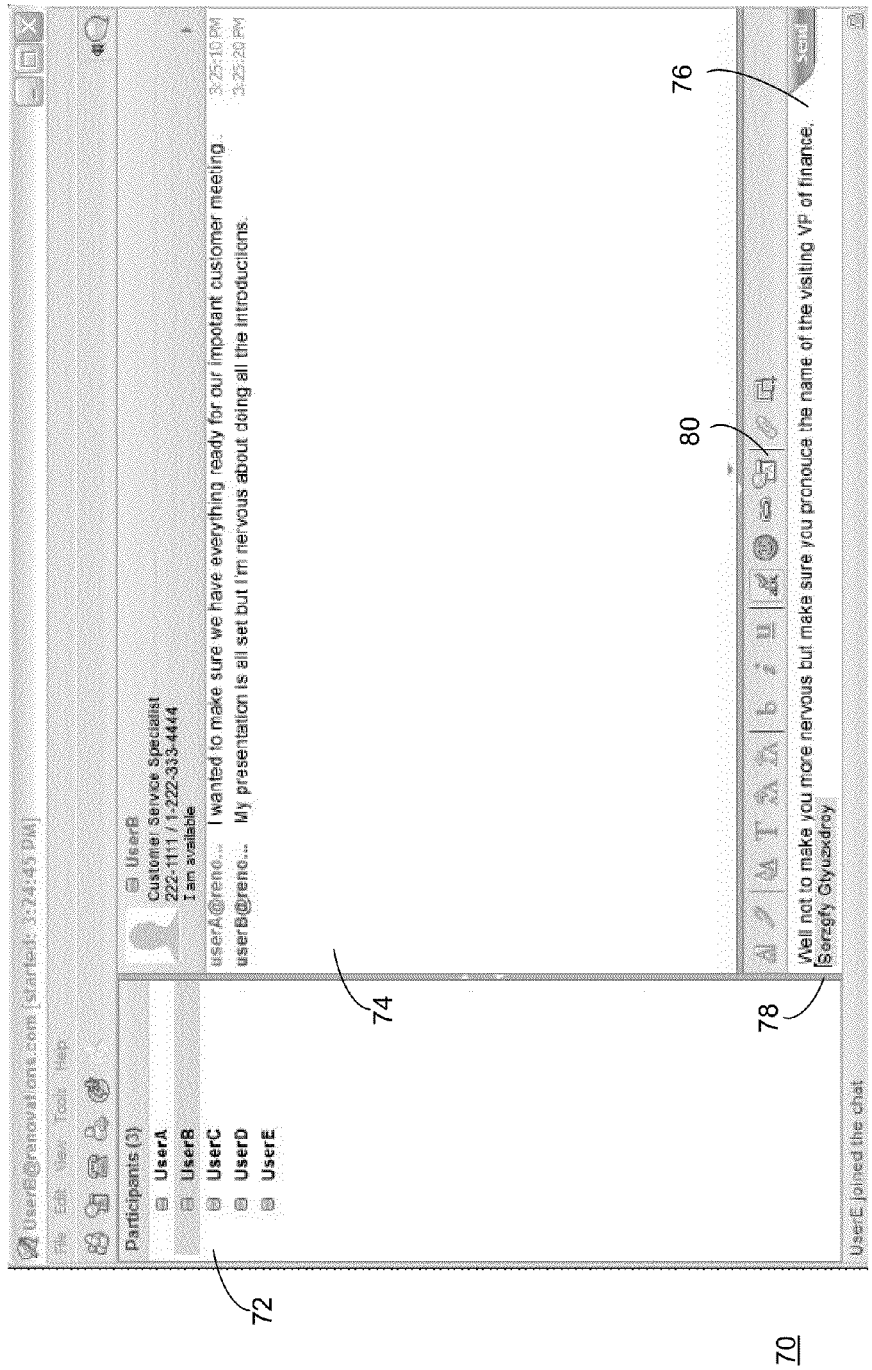
FIG. 3 is a first diagrammatic view of an implementation of a text communication pronunciation process.

In FIG. 3, part of a text communication User A intends to transmit to User B may include an important name 78 that is particularly different to pronounce—"Serzgfy Gtyuzxdroy." (Although a name is used as an example here, it will be understood that the discussion may also apply to a different type of word or phrase.) In order to ensure that User B is aware of the correct pronunciation, User A may select the text "Serzgfy Gtyuzxdroy" by, for example, highlighting the text with her mouse then clicking on action button 80. This, or a similar action, may indicate that this portion of the text communication has been selected to be associated with a pronunciation.

Alternatively, in some text communications (not shown), User A may have already sent the text included in text-entry window 76 of FIG. 3. Because of the unusual spelling of "Serzgfy Gtyuzxdroy," User B may be interested in receiving clarification as to pronunciation of the name. In such a case, User B may select that text from his conversation window (not shown) by, for example highlighting the text then clicking an action button. This, or a similar action, may indicate that the text requires a pronunciation, even though it has already been sent to User B. If, for example, process 12 is running on personal computer 28 associated with User A, whereas User B is using a notebook computer 34, process 12 may receive information at personal computer 28 via notebook computer 34 indicating that User B has selected "Serzgfy Gtyuzxdroy" and clicked the action button. Process 12 may thereby determine that the selected portion of the text communication includes the name "Serzgfy Gtyuzxdroy." It will be understood, further, that other configurations of users and computing devices will be possible.

Similarly, after having already sent the text included in text-entry window 76 of FIG. 3, User A may realize that she should have provided a pronunciation for "Serzgfy Gtyuzxdroy." Accordingly, User A may select that text, as it appears in conversation window 74, by, for example, highlighting the text with her mouse then clicking on action button 80. User A may thereby indicate that the selected portion of the text communication includes "Serzgfy Gtyuzxdroy."

Figure 4:
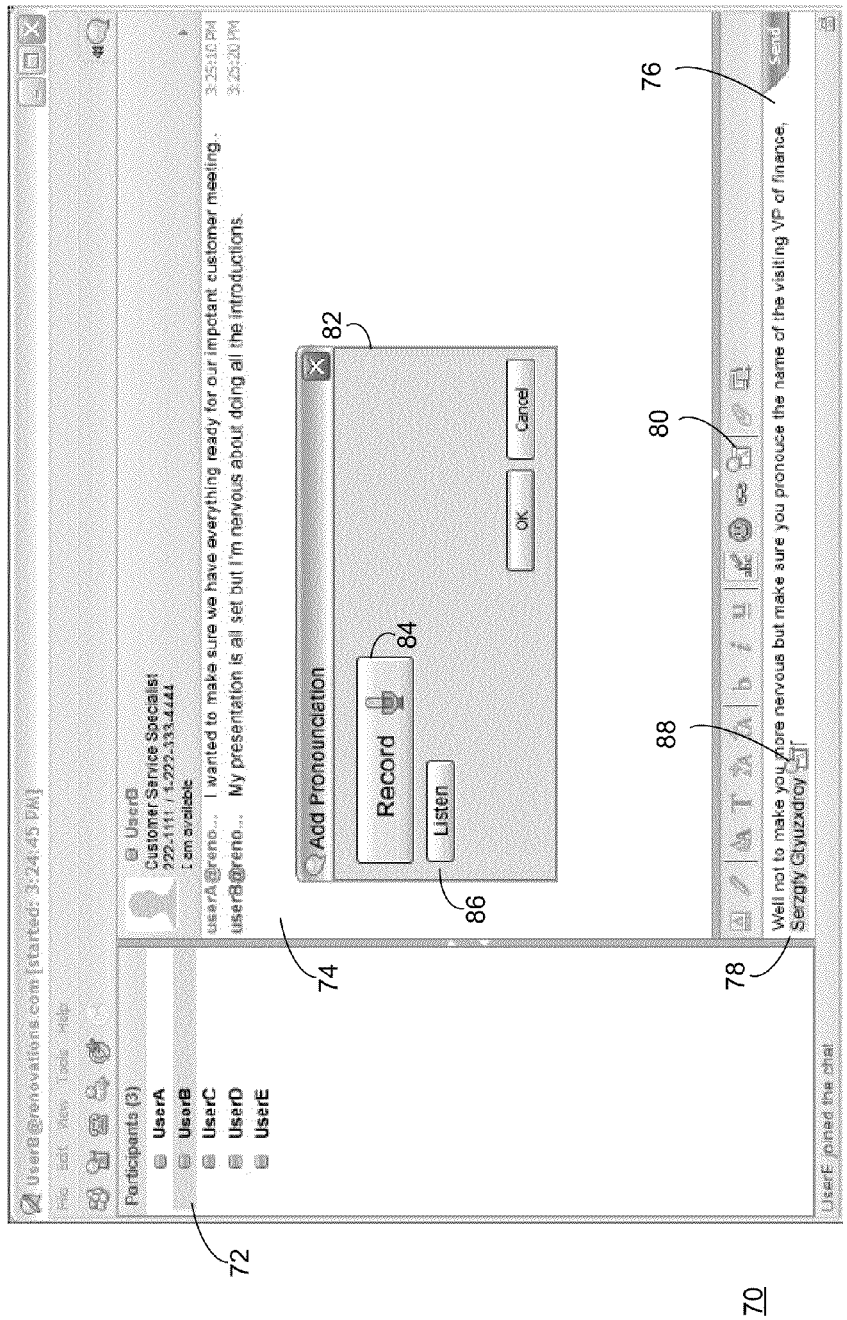
FIG. 4 is a second diagrammatic view of an implementation of a text communication pronunciation process.

Process 12 may further include providing 102, at a first computing device, a prompt to record a pronunciation relating to the selected portion of the text communication. For example, referring now also to FIG. 4, once "Serzgfy Gtyuzxdroy" has been selected, the sender of the text communication in question, for example, User A, may be presented with recording prompt window 82. User A may then record a pronunciation of "Serzgfy Gtyuzxdroy" by, for example, clicking record button 84 and speaking into a microphone device. Window 82 may also include, for example, listen button 86. By clicking listen button 86 after recording her pronunciation of "Serzgfy Gtyuzxdroy," User A may, for example, hear the recorded pronunciation in order to verify that it has been recorded clearly and correctly. If a better pronunciation is desired, User A may, for example, click record button 84 a second time in order to re-record her pronunciation of "Serzgfy Gtyuzxdroy."

Figure 5:
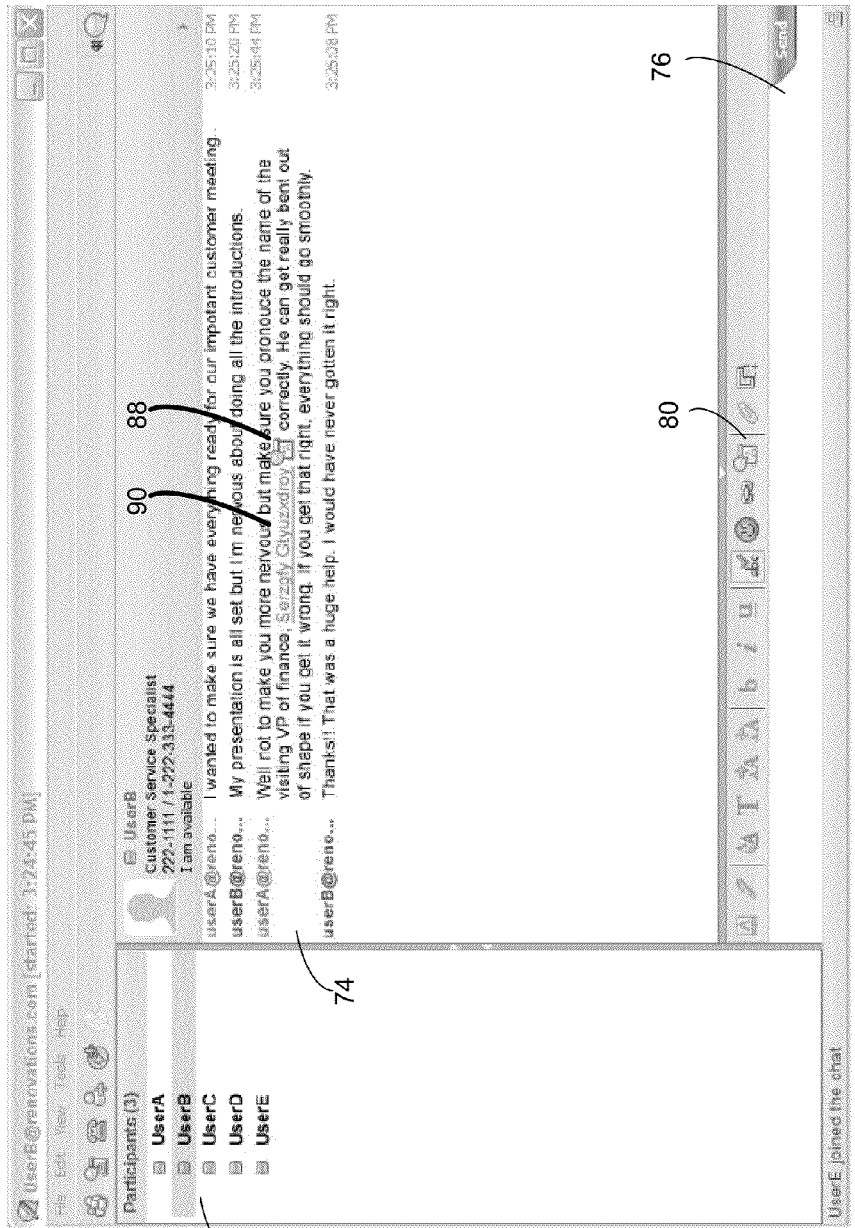
FIG. 5 is a third diagrammatic view of an implementation of a text communication pronunciation process.

Referring now also to FIG. 5, process 12 may also include associating 104 the recorded pronunciation with the selected portion of the text communication. Based on the selection of "Serzgfy Gtyuzxdroy," a recording created by User A may be associated with the text "Serzgfy Gtyuzxdroy" as entered by User A in text-entry window 76, or as seen by User A and B in a conversation window, e.g., conversation window 74. In this manner, the recorded pronunciation of "Serzgfy Gtyuzxdroy" may be available to User A or User B immediately upon seeing the text communication or upon review of an archive record of the text communication. For example, User B may terminate his present text communication with User A, but desire to review the text conversation at a later time. If the text communication has been saved or otherwise archived, the recorded pronunciation of "Serzgfy Gtyuzxdroy" may continue to be associated with the text "Serzgfy Gtyuzxdroy" in the archive or saved file, thereby allowing User B to access both the text communication and the important pronunciation. In a similar manner, a recorded pronunciation associated with a portion of text communication from an eMeeting may be available to users viewing an archived version of the eMeeting.

Process 12 may further include displaying 106 a visual indicator relating to the selected portion of the text communication and the recorded pronunciation. In order to facilitate use of the recorded pronunciation, a visual indicator may be displayed in order to indicate that a recorded pronunciation is associated with a particular word, name or phrase. For example, pronunciation icon 88 may appear next to the word, name or phrase in text-entry window 76 or in conversation window 74. Similarly, the portion of the text communication with which a recorded pronunciation is associated may be indicated by a particular font, style or color of text that differs from the font, style or color of surrounding text. For example, "Serzgfy Gtyuzxdroy" may be indicated in conversation window 74 with underlining 90 or with another visual difference from the surrounding text.

Process 12 may additionally include transmitting 108 the recorded pronunciation to a second computing device. For example, the recorded pronunciation of "Serzgfy Gtyuzxdroy" may be transmitted from User A to User B along with the text communication with which the recorded pronunciation is associated. In this case, User B may receive a file containing the recorded pronunciation, which may then be stored on the computer of User B or elsewhere. Alternatively, the recorded pronunciation may be transmitted via streaming. For example, the file containing the recorded pronunciation may be stored remotely from User B's computer, but streamed to his computer at the request of User B in order to facilitate User B listening to the recorded pronunciation.

Further, process 12 may include playing 110 the recorded pronunciation based on an input 116 at a first computing device or a second computing device. The recorded pronunciation may be played to one or more users. For example, User A may click on pronunciation icon 88 in text-entry window 76 or either User A or User B may click on pronunciation icon 88 in their respective conversation window (e.g., conversation window 74) in order to play the recorded pronunciation on their respective computing devices. Alternatively, it may be possible to click directly on the selected text, (e.g., underlined text 90) or another button (not shown) in order to play the recorded pronunciation.

The text communication of process 12 may include for example, an instant messaging communication or a message from a chat-enabled eMeeting. As noted, instant messaging programs allow direct text communication between conversation participants and may be integrated with other programs or may serve as stand-alone applications. As discussed above, an eMeeting may be a meeting, presentation, seminar or other interaction that takes place via electronic means, often via a centralized server. Certain eMeetings may be chat-enabled, e.g., they may permit participants to communicate with each other and/or the presenters via text communication, often via a centralized text forum.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer-implemented method comprising:
   determining a user selected portion of a text communication selected on a first computing device, wherein the text communication includes visible text and wherein the user selected portion of the text communication is the visible text;
   providing at the first computing device, in real-time during a text communication session between the first computing device and a second computing device, a user selectable voice prompt that allows the user to record a pronunciation of the user selected portion of the visible text in the text communication, wherein the pronunciation of the user selected portion of the visible text in the text communication is recorded in real-time at the first computing device where the user selected portion of the visible text in the text communication is selected by the user;

associating the recorded pronunciation of the visible text in the text communication with the user selected portion of the visible text in the text communication;

transmitting both the visible text in the text communication and the recorded pronunciation of the user selected portion of the visible text in the text communication to a second computing device; and displaying at the first computing device and the second computing device simultaneously, a visual indicator relating to the user selected portion of the visible text in the text communication and the recorded pronunciation that facilitates the use of the recorded pronunciation.

2. The method of claim 1 further comprising:
playing the recorded pronunciation based upon, at least in part, an input received from at least one of the first computing device and the second computing device.

3. The method of claim 1 further comprising:
determining the user selected portion of the visible text in the text communication based upon, at least in part, an input at the first computing device.

4. The method of claim 1 further comprising:
determining the user selected portion of the visible text in the text communication based upon, at least in part, an input at the second computing device.

5. The method of claim 1 wherein the text communication includes an instant messaging communication.

6. The method of claim 1 wherein the text communication includes a message from a chat-enabled eMeeting.

7. A computer program product residing on a non-transitory computer readable storage medium having a plurality of instructions stored thereon, which, when executed by a processor, cause the processor to perform operations comprising:

determining a user selected portion of a text communication selected on a first computing device, wherein the text communication includes visible text and wherein the user selected portion of the text communication is the visible text;

providing at the first computing device, in real-time during a text communication session between the first computing device and a second computing device, a user selectable voice prompt that allows the user to record a pronunciation of the user selected portion of the visible text in the text communication, wherein the pronunciation of the user selected portion of the visible text in the text communication is recorded in real-time at the first computing device where the user selected portion of the visible text in the text communication is selected by the user;

associating the recorded pronunciation of the visible text in the text communication with the user selected portion of the visible text in the text communication;

transmitting both the visible text in the text communication and the recorded pronunciation of the user selected portion of the visible text in the text communication to a second computing device; and displaying at the first computing device and the second computing device simultaneously, a visual indicator relating to the user selected portion of the visible text in the text communication and the recorded pronunciation that facilitates the use of the recorded pronunciation.

8. The computer program product of claim 7 further comprising instructions for:
playing the recorded pronunciation based upon, at least in part, an input received from at least one of the first computing device and the second computing device.

9. The computer program product of claim 7 further comprising instructions for:
determining the user selected portion of the visible text in the text communication based upon, at least in part, an input at the first computing device.

10. The computer program product of claim 7 further comprising instructions for:
determining the user selected portion of the visible text in the text communication based upon, at least in part, an input at the second computing device.

11. The computer program product of claim 7 wherein the text communication includes an instant messaging communication.

12. The computer program product of claim 7 wherein the text communication includes a message from a chat-enabled eMeeting.

13. A computer system comprising:
at least one processor;
at least one memory architecture coupled with the at least one processor;
a first software module executable by the at least one processor and the at least one memory architecture, wherein the first software module is configured determine a user selected portion of a text communication selected on a first computing device, wherein the text communication includes visible text and wherein the user selected portion of the text communication is the visible text;
a second software module executable by the at least one processor and the at least one memory architecture, wherein the second software module is configured to provide at the first computing device, in real-time during a text communication session between the first computing device and a second computing device, a user selectable voice prompt that allows the user to record a pronunciation of the user selected portion of the visible text in the text communication, wherein the pronunciation of the user selected portion of the visible text in the text communication is recorded in real-time at the first computing device where the user selected portion of the visible text in the text communication is selected by the user;
a third software module executable by the at least one processor and the at least one memory architecture, wherein the third software module is configured to associate the recorded pronunciation of the visible text in the text communication with the user selected portion of the visible text in the text communication; and
a fourth software module executable by the at least one processor and the at least one memory architecture, wherein the fourth software module is configured to transmit both the visible text in the text communication and the recorded pronunciation of the user selected portion of the visible text in the text communication to a second computing device; and
a fifth software module executable by the at least one processor and the at least one memory architecture, wherein the fifth software module is configured to display at the first computing device and the second computing device simultaneously, a visual indicator relating to the user selected portion of the visible text in the text communication and the recorded pronunciation that facilitates the use of the recorded pronunciation.

14. The computer system of claim 13 further comprising:
a sixth software module executable by the at least one processor and the at least one memory architecture, wherein the sixth software module is configured to play the recorded pronunciation based upon, at least in part, an input received from at least one of the first computing device and the second computing device.

15. The computer system of claim 13 further comprising:

a seventh software module executable by the at least one processor and the at least one memory architecture, wherein the seventh software module is configured to determine the user selected portion of the visible text in the text communication based upon, at least in part, an input at the first computing device.

16. The computer system of claim 13 further comprising:

an eighth software module executable by the at least one processor and the at least one memory architecture, wherein the eighth software module is configured to determine the user selected portion of the visible text in the text communication based upon, at least in part, an input at the second computing device.

17. The computer system of claim 13 wherein the text communication includes an instant messaging communication.

18. The computer system of claim 13 wherein the text communication includes a message from a chat-enabled eMeeting.

* * * * *